United States Patent [19]
Kamata et al.

[11] Patent Number: 5,285,993
[45] Date of Patent: Feb. 15, 1994

[54] SEAT SLIDE DEVICE WITH PROTECTING COVER

[75] Inventors: Kiyohiko Kamata; Hatsuo Hayakawa; Mikio Honma, all of Yokohama, Japan

[73] Assignee: Ohi Seisakusho Co., Ltd., Yokohama, Japan

[21] Appl. No.: 890,274

[22] Filed: May 29, 1992

[30] Foreign Application Priority Data

May 30, 1991 [JP] Japan ............... 3-048234[U]

[51] Int. Cl.$^5$ ............................................. F16M 13/00
[52] U.S. Cl. ........................... 248/429; 248/345.1; 248/430; 297/344.1
[58] Field of Search .......... 248/424, 429, 430, 345.1; 297/317, 344, 346, 468, 473; 296/65.1

[56] References Cited

U.S. PATENT DOCUMENTS

| | | | |
|---|---|---|---|
| 4,821,991 | 4/1989 | Aihara et al. | 248/430 |
| 5,011,209 | 4/1991 | Takarabe et al. | 248/430 X |
| 5,039,166 | 8/1991 | Kojho | 297/344 |
| 5,104,084 | 4/1992 | Kumagai et al. | 248/430 |
| 5,137,244 | 8/1992 | Negi | 248/429 X |
| 5,183,234 | 2/1993 | Saito | 248/430 |
| 5,188,329 | 2/1993 | Takahara | 248/430 |
| 5,209,447 | 5/1993 | Yokota | 248/429 |

FOREIGN PATENT DOCUMENTS

| | | |
|---|---|---|
| 60-34938 | 3/1985 | Japan . |
| 1344320A | 1/1974 | United Kingdom . |
| 1362040A | 7/1974 | United Kingdom . |
| 2221152A | 1/1990 | United Kingdom . |

Primary Examiner—David A. Scherbel
Assistant Examiner—Derek J. Berger
Attorney, Agent, or Firm—Foley & Lardner

[57] ABSTRACT

A lower rail of channel structure is secured a floor. The lower rail has a longitudinally extending slot in an upper portion thereof. An upper rail is slidably engaged with the lower rail and mounts thereon a seat. The upper rail includes a base portion which is slidably received in the lower rail and a supporting wall portion which extends upward from the base portion and passes through the slot of the lower rail for connection with the seat. A protecting cover covers one end portion of the lower rail and has a longitudinally extending slit into which the supporting wall portion of the upper rail is inserted when the upper rail assumes an extreme position relative to the lower rail. A concealing structure is integral with the projecting cover and constructed to conceal the slit. The concealing structure and the supporting wall portion are so constructed as to permit the insertion of the supporting wall portion into the slit irrespective of provision of the concealing structure.

10 Claims, 2 Drawing Sheets

SEAT SLIDE DEVICE WITH PROTECTING COVER

BACKGROUND OF THE INVENTION

1. Field of the Invention

The present invention relates in general to seal slide devices for a motor vehicle, and more particularly to seat slide devices of a type having a protecting cover.

2. Description of the Prior Art

Some of conventional seat slide devices are of a type in which when two movable upper rails on which a seat is mounted are moved forward to the frontmost positions relative to two stationary lower rails, the rear end portion of each lower rail becomes exposed to the space for a rear seat passenger. A seat slide device of such type is disclosed in Japanese Utility Model First Provisional Publication No. 60-34938.

In such type seat slide devices, a protecting cover of plastic or the like is usually mounted to the rear end portion of each lower rail to cover the same for the sake of safety of the rear seat passenger as well as for the sake of external appearance of the seat slide device. Due to inherent construction of such seat slide device, the protecting cover is formed with an axially extending slit for permitting the movement of the movable upper rail to its rearmost position.

However, presence of such exposed slit in the protecting cover not only spoils the external appearance of the seat slide device but also induces a possibility of leading foreign things into the lower rail through the slit.

SUMMARY OF THE INVENTION

It is therefore an object of the present invention to provide a seat slide device having a protecting cover, which device is free of the above-mentioned drawbacks.

According to the present invention, there is provided a seat slide device which comprises a lower rail of channel structure adapted to be secured to a floor, the lower rail including means which defines a longitudinally extending slot in an upper portion of the lower rail; an upper rail slidably engaged with the lower rail and adapted to mount thereon a seat, the upper rail including a base portion which is slidably received in the lower rail and a supporting wall portion which extends upward from the base portion and passes through the slot of the lower rail for connection with the seat; a protecting cover covering one end portion of the lower rail, the protecting cover having a longitudinally extending slit into which the supporting wall portion of the upper rail is inserted when the upper rail assumes an extreme position relative to the lower rail; a concealing structure integral with the projecting cover, the concealing structure being constructed to conceal the slit; and means for permitting the insertion of the supporting wall portion into the slit irrespective of provision of concealing structure.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figures 1, 2:
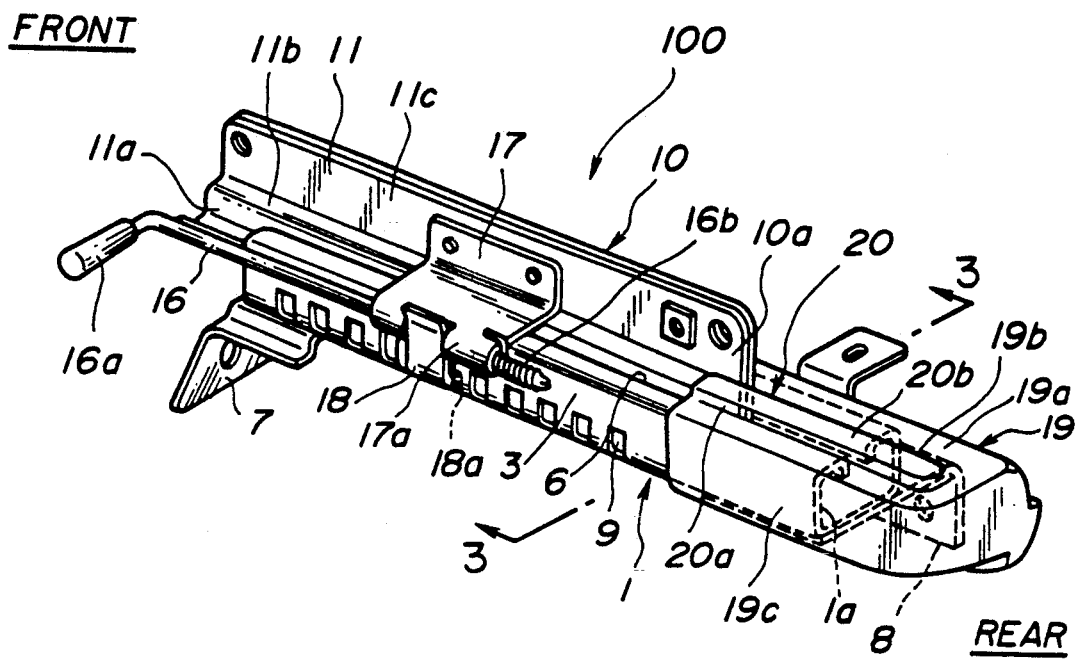
FIG. 1 is a perspective view of a seat slide device according to the present invention.
FIG. 2 is an internal view of a passenger motor vehicle in which the seat slide device of the invention is mounted.

Referring to the accompanying drawings, particularly FIG. 1, there is shown a seat slide device 100 of the present invention, which device is arranged to support a right side of an associated seat "S", as is seen from FIG. 2.

Figure 3:
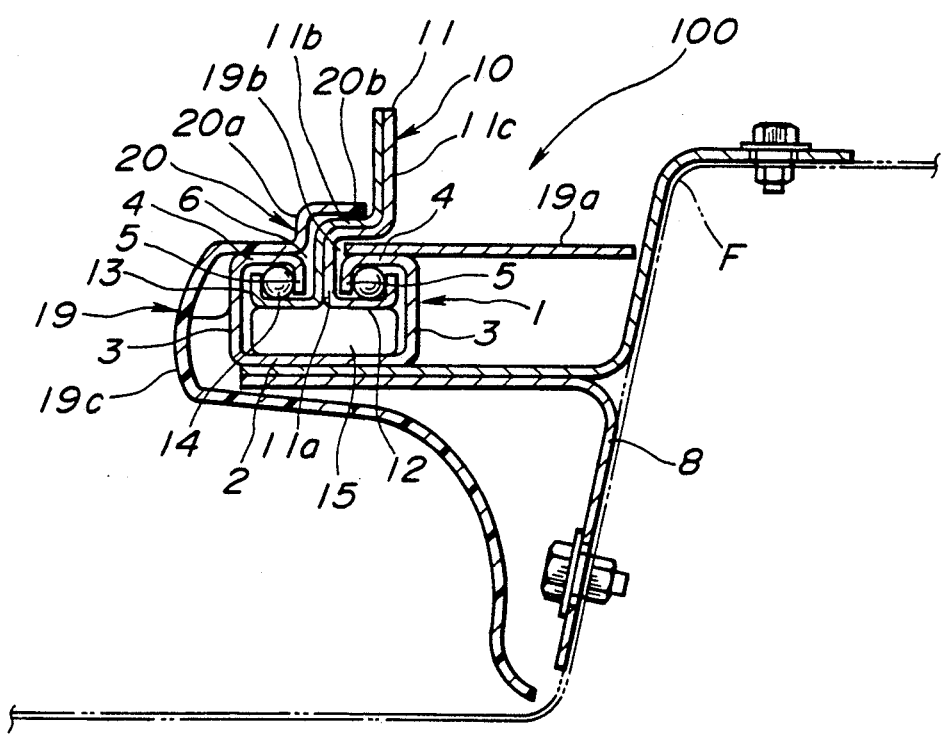
FIG. 3 is a sectional view taken along the line A—A of FIG. 1.

In FIG. 1, denoted by numeral 1 is a lower rail which is connected through front and rear brackets 7 and 8 to a vehicle floor "F" (see FIGS. 2 and 3).

As is seen from FIG. 3, the lower rail 1 is a channel member which comprises a longitudinally extending base wall 2, two side walls 3 raised perpendicularly from lateral sides of the base wall 2, two upper walls 4 extending toward each other from respective tops of the side walls 3 and two small bent walls 5 extending downward from respective inward ends of the upper walls 4. Between the two upper walls 4, there is defined a longitudinally extending slot 6 which has a given width. As is seen from FIG. 1, the inward side wall 3 is formed with a plurality of evenly spaced notches 9.

Referring back to FIG. 3, denoted by numeral 10 is an upper rail which is slidably engaged with the lower rail 1 and carries thereon the seat "S" (see FIG. 2). The upper rail 10 is an elongate member which comprises a longitudinally extending base wall 12 slidably received in the lower rail 1, two small bent walls 13 extending upward from lateral sides of the base wall 12 and a supporting wall 11 extending upward from a middle portion of the base wall 12 and passing through the longitudinally extending slot 6 of the lower rail 1.

Rollers 15 are rotatably disposed between the base wall 2 of the lower rail 1 and the base wall 12 of the upper rail 10, and balls 14 are rotatably received in two smaller elongate channels each being defined by the upper and small bent walls 4 and 5 of the lower rail 1 and the base and small bent walls 12 and 13 of the upper rail 10. With these rollers 15 and balls 14, the axial movement of the upper rail 10 relative to the lower rail 1 is smoothly carried out.

As will be understood from FIGS. 1 and 2, the exposed upper portion 11b of the supporting wall 11 is secured through bolts (not shown) to a right side of a seat cushion frame of the seat "S". Thus, the seat "S" is moved forward and rearward together with the upper rail 10 relative to the floor "F".

As seen from FIG. 3, for the purpose which will become apparent hereinafter, the supporting wall 11 of the upper wall 10 is bent to have a crank-like cross section. That is, the supporting wall 11 comprises a first part 11a which extends upward from the base wall 12 and passes through the slot 6 of the lower rail 1, a second part 11b which extends laterally outwardly from the top of the first part 11a and a third part 11c which extends upwardly from the lateral outward end of the second part 11b.

Referring back to FIG. 1, a bracket 17 is secured to the exposed upper portion (or the third part) of the supporting wall 11 of the upper rail 10. The bracket 17 has two spaced curled supporting portions 17a by which a control shaft 16 is rotatably supported. The control shaft 16 has a handle 16a at its front portion.

A latch member 18 is secured to the control shaft 16 at the position between the two spaced curled supporting portions 17a of the bracket 17. The latch member 18 has at its lower end latch pawls 18a which are latchingly engageable with the notches 9 of the lower rail 1. A coil spring 16b is disposed about a rear end of the control shaft 16 to bias the same in a direction to achieve the latched engagement of the latch member 18 with the notches 9.

Thus, it will be appreciated that when the latch pawls 18a of the latch member 18 are engaged with some of the notches 9, the upper rail 10 is locked relative to the lower rail 1, and thus, the seat on the upper rail 10 assumes a certain locked position relative to the vehicle floor "F". While, when, due to manipulation of the handle 16a, the control shaft 16 is turned against the force of the spring 16b, the latch pawls 18a of the latch member 18 are disengaged from the notches 9. Under this condition, the upper rail 10 can be moved freely forward or rearward relative to the lower rail 1. That is, under this unlatched condition, the seat can be moved to a desired position.

Designated by numeral 19 is a protecting cover of molded plastic which is shaped like a box and covers both a rear portion 1a of the lower rail 1 and the rear bracket 8.

As is seen from FIGS. 1 and 3, the protecting cover 19 comprises an upper wall 19a which is put on the upper walls 4 of the lower rail 1 to cover the same, a side wall 19c which extends downward from an inward end of the upper wall 19a and covers both the inside side wall 3 of the lower rail 1 and the rear bracket 8, and a rear wall 19d (see FIG. 1) which covers the naked lower end 1a of the lower rail 1. The protecting cover 19 is secured to the rear bracket 8.

As is seen from FIGS. 1 and 3, the upper wall 19a of the projecting cover 19 is formed with a longitudinally extending slit 19b through which the first part 11a of the supporting wall 11 of the upper rail 10 passes.

In the present invention, a concealing structure 20 integral with the protecting cover 19 is further employed for concealing the slit 19b.

That is, as is best seen from FIG. 3, the concealing structure 20 is shaped to have a generally L-shaped cross section, comprising a small elongate side wall 20a which is raised from an inward part of the upper wall 19a and extends along the slit 19b, and a small elongate upper wall 20b which extends laterally outwardly from a top of the small elongate side wall 20a. As is shown, the upper wall 20b extends over the slit 19b to sufficiently cover the same.

With this concealing structure 20, there is defined between the major upper wall 19a and the small elongate upper wall 20b a small but given clearance which is sized to sufficiently receive the second part 11b of the supporting wall 11 of the upper rail 10. Thus, even when the upper rail 10 is moved back toward its rearmost position, the concealing structure 20 does not interrupt the rearward movement of the supporting wall 11 of the upper rail 10.

In the following, advantages of the present invention will be described.

(1) Due to provision of the protecting cover 19, the unsightly rear end portion of the lower rail 1 and the unsightly rear bracket 8 are concealed. This improves the external appearance of the seat slide device 100. Of course, the protecting cover 19 raises the safety of the device 100.

(2) Due to provision of the concealing structure 20, the unsightly slit 19b formed in the protecting cover 19 is concealed. This promotes the improvement in the external appearance of the seat slide device 100. Furthermore, provision of the concealing structure 20 eliminates the undesired possibility of leading foreign things into the lower rail 1 through the slot 6.

Although the foregoing description is directed to the seat slide device 100 which supports a right side of the seat "S", the concept of the present invention is applicable to the other seat slide device (see FIG. 2) which supports a leaf side of the seat "S".

What is claimed is:

1. A seat slide device comprising:
    a lower rail of channel structure adapted to be secured to a floor, said lower rail including means which defines a longitudinally extending slot in an upper portion of said lower rail;
    an upper rail slidably engaged with said lower rail and adapted to mount thereon a seat, said upper rail including a base portion which is slidably received in said lower rail and a supporting wall portion which extends upward from said base portion and passes through said slot of the lower rail for connection with the seat;
    a protecting cover covering one end portion of said lower rail, said protecting cover having a longitudinally extending slit into which said supporting wall portion of said upper rail is inserted when said upper rail assumes an extreme position relative to said lower rail;
    a concealing structure integral with said protecting cover, said concealing structure being constructed to conceal said slit; and
    means for permitting the insertion of said supporting wall portion into said slit irrespective of provision of said concealing structure.

2. A seat slide device as claimed in claim 1, in which said means comprises a bent part of said supporting wall portion, which part becomes positioned above the slit of said protecting cover when said upper rail assumes said extreme position.

3. A seat slide device as claimed in claim 2, in which said concealing structure comprises:
    an elongate side wall which is raised from said protecting cover and extends along said slit; and
    an elongate upper wall which extends laterally from an upper end of said elongate side wall while keeping a given clearance between the elongate upper wall and said protecting cover, said given clearance being sized to spacedly receive said bent part of said supporting wall portion.

4. A seat slide device as claimed in claim 3, in which said bent part of said supporting wall portion has a generally crank-shaped cross section.

5. A seat slide device as claimed in claim 4, in which said supporting wall portion comprises:
    a first part which, when said upper rail assumes said extreme position, extends upward through said slit of said protecting cover and is in parallel with said elongate side wall of said concealing structure;
    a second part which extends laterally from an upper end of said first part and, when said upper rail assumes said extreme position, passes through said given clearance; and
    a third part which extends upward from a lateral end of said second part.

6. A seat slide device as claimed in claim 5, in which said protecting cover is constructed of molded plastic.

7. A seat slide device as claimed in claim 5, in which said protecting cover is secured to said lower rail through a bracket.

8. A seat slide device as claimed in claim 5, further comprising:
   rollers rotatably disposed between said base portion of said upper rail and a bottom wall of said lower rail; and
   balls rotatably received between said base portion of said upper rail and an upper wall of said lower rail.

9. A seat slide device as claimed in claim 8, further comprising:
   means defining a plurality of notches in said lower rail;
   a control shaft rotatably supported by said upper rail; and
   a latch member secured to said control shaft, said latch member being latchingly engageable with the notches of said lower rail.

10. A seat slide device as claimed in claim 9, further comprising biasing means by which said control shaft is biased in a direction to achieve the latched engagement of said latch member with said notches.

* * * * *